United States Patent [19]

Somemiya et al.

[11] Patent Number: 5,730,828
[45] Date of Patent: Mar. 24, 1998

[54] RAPID CURING ADHESION METHOD

[75] Inventors: Toshio Somemiya, Chiba-ken; Hidetoshi Matsumoto, Matsudo, both of Japan

[73] Assignee: Cemedine Co., Ltd., Tokyo, Japan

[21] Appl. No.: 634,744

[22] Filed: Apr. 19, 1996

[30] Foreign Application Priority Data

Apr. 25, 1995 [JP] Japan ..................... 7-100998

[51] Int. Cl.$^6$ ..................... B32B 27/16
[52] U.S. Cl. ..................... 156/273.3; 156/275.7; 156/310; 156/314; 156/331.1; 369/286
[58] Field of Search ..................... 156/272.2, 273.3, 156/273.5, 273.7, 273.9, 275.5, 275.7, 310, 314, 331.1, 331.3, 332, 286; 369/286

[56] References Cited

U.S. PATENT DOCUMENTS

| | | | |
|---|---|---|---|
| 4,533,446 | 8/1985 | Conway et al. | 156/273.3 |
| 4,591,618 | 5/1986 | Naito et al. | 525/279 |
| 4,724,177 | 2/1988 | Russo | 428/36.6 |
| 5,135,598 | 8/1992 | Kobe et al. | 156/273.3 |
| 5,244,775 | 9/1993 | Miwa et al. | 369/286 |
| 5,544,773 | 8/1996 | Haruta | 216/13 |

*Primary Examiner*—Michael W. Ball
*Assistant Examiner*—Michael A. Tolin
*Attorney, Agent, or Firm*—Armstrong, Westerman, Hattori, McLeland & Naughton

[57] ABSTRACT

This invention provides a method which is capable of strong and rapid-curing adhesion of various kinds of components including plastic components. Especially, this method can be industrially utilized with high efficiency in in-line adhesion assembly of various kinds of components, for example, plastic components, such as adhesion assembly of optical disks by adhering plastic plates together. Namely, this method comprises the steps of forming a face for effecting curing acceleration for an anaerobic curing adhesive on one or both of the adhering surfaces of the components to be adhered, coating the anaerobic curing adhesive on one or both of the adhering surfaces of the components, and laying one adhering surface on the other adhering surface of the components.

4 Claims, No Drawings

RAPID CURING ADHESION METHOD

BACKGROUND OF THE INVENTION

1. Field of the Invention

The present invention relates to a method for carrying out rapid adhesion of various types of components, for example, plastic, metallic, wooden, glass or ceramic materials.

2. Description of the Related art

Among these components, plastic materials are advantageous in their properties, such as easy molding, easy processing, low price and easy mass production. Therefore, the molded plastic articles are widely used for domestic use or in various industrial fields. These various molded plastic articles (including any kinds of molded plastic articles, such as half-finished or finished articles as of blocks, sheets or films; plastic components whose surface is vapor deposited or coated with metal, such as aluminium, gold, silver, copper and/or tantalum; and components formed by coating a plastic coating material on an outer surface of plastic, metallic, wooden and ceramic materials) are now referred to as "plastic components". Moreover, the articles produced with these plastic, metallic, wooden, glass or ceramic materials are merely referred to as "components".

For various plastic components, however, it is difficult to mold a monoblock article having a complicated shape. Therefore, adhesion assembly is often cheaper than monoblock molding in such a case. Adhesion process is indispensable in case of using different kinds of materials.

Industrially, in case of carrying out such adhesion assembly of these plastic components in a factory, an adhesive having rapid curing properties is also indispensable for a continuous production. For rapid adhesion of plastic components, various rapid curing type adhesives, such as cyanoacrylate type instantaneous adhesives, ultraviolet curing type adhesives, anaerobic curing type adhesives and primer curing type compositions have been used. However, for each of them, there are the following problems.

(1) In case of the cyanoacrylate type instantaneous adhesives, how to locate adherends when adhering them at their relatively large areas is difficult because the curing time of the adhesives is too short.

(2) In case of the ultraviolet curing adhesives, how to locate adherends is easy, but these adhesives are not applicable to the component which does not transmit light.

(3) In case of the anaerobic curing adhesives and primer curing compositions, they can not be cured until an active surface is formed by coating a suitable curing accelerator.

Further, in case of using such a curing accelerator, its activity after being coated tends to be degraded, and its handling becomes difficult because a surface coated therewith is sticky. Also, it is difficult to coat the curing accelerator in a predetermined amount with good accuracy. Therefore, lack of uniformity of the coated primer amount often leads to uneven adhesion. Additionally, there are no anaerobic curing adhesives with sufficient or strong adhesion properties to the above plastic components.

SUMMARY OF THE INVENTION

To solve the problem of the above conventional adhesion method, the inventors made a study of rapid curing adhesion for various kinds of components, for example, plastic components. Thus, it is an object of the present invention to provide a method by which strong and rapid curing adhesion of various kinds of components, for example, plastic components is realized. It is another object of this invention to provide a method which can be industrially utilized with high efficiency in in-line adhesion assembly of various kinds of components, for example, plastic components, including adhesion assembly of optical disks by adhering plastic plates together.

Further object of this invention is to provide a method in which a film to be cured by activation energy rays is formed on surfaces of various components, for example, plastic components, and a curing acceleration effect for an anaerobic curing adhesive is given to the film, that is, a curing accelerator for the anaerobic curing adhesive is added to such activation energy ray curing compositions, thereby strong and rapid curing adhesion of various kinds of components, for example, plastic components being realized.

The term "activation energy ray curing compositions" stands for compositions which can be cured by irradiation of activation energy rays, for example, ultraviolet rays, visible rays, electron rays and the like. (Hereinafter, in some cases, these rays will be merely referred to as activation energy rays.) For example, an adhesive to be cured by ultraviolet rays is referred to as an ultraviolet ray curing adhesive. Thus, such compositions are collectively referred to as activation energy ray curing compositions.

To solve the problem described above, according to the first aspect of the present invention, there is provided a rapid curing adhesion method for adhering components together, which comprises the steps of forming a face for effecting curing acceleration for an anaerobic curing adhesive on one or both of adhering surfaces of the components to be adhered, coating the anaerobic curing adhesive on one or both of the adhering surfaces of the components to be adhered, and laying one adhering surface on the other adhering surface of the components.

Alternatively, according to the second aspect of the present invention, there is provided a rapid curing adhesion method for adhering components together, which comprises the steps of: coating activation energy ray curing compositions containing a curing accelerator for an anaerobic curing adhesive on one or both of adhering surfaces of the components to be adhered, forming a cured film by irradiating activation energy rays onto the coated activation energy ray curing compositions, coating the anaerobic curing adhesive on one or both of the adhering surfaces of the components to be adhered, and laying one adhering surface on the other adhering surface of the components.

Further, according to the third aspect of the present invention, there is provided a rapid curing adhesion method for adhering components together, which comprises the steps of: coating a coating material containing a curing accelerator for an anaerobic curing adhesive on one or both of the adhering surfaces of the components to be adhered, coating the anaerobic curing adhesive on one or both of the adhering surfaces of the components to be adhered, and laying one adhering surface on the other adhering surface of the components.

Further, according to the fourth aspect of the present invention, there is provided a rapid curing adhesion method for adhering components together, which comprises the steps of: vapor depositing or coating an inert metal as a first layer on one or both of the adhering surfaces of the components to be adhered and then vapor depositing or coating an active metal as a second layer on the first layer, coating an anaerobic curing adhesive on one or both of the adhering surfaces of the components to be adhered, and laying one adhering surface on the other adhering surface of the components.

Preferably, the inert metal is aluminium, gold, silver or tantalum, and the active metal is copper.

Preferably, the components are composed of one or two selected from the group consisting of plastic materials, metallic materials, wooden materials, glass materials and ceramic materials.

Materials coated with a coating material may be used as the above components.

Preferably, the materials are one or two selected from the group consisting of plastic materials, metallic materials, wooden materials, glass materials and ceramic materials.

The components include materials whose surfaces are vapor deposited or coated in advance with a suitable metal. Further, the metal includes aluminium, gold, silver, copper and tantalum.

Also, the components may be materials whose surfaces are vapor deposited or coated with an inert metal as a first layer and then vapor deposited or coated with an active metal as a second layer on the first layer. The inert metal may be aluminium, gold, silver or tantalum, and the active metal may be copper.

Alternatively, according to the fifth aspect of the present invention, there is provided a rapid curing adhesion method for adhering plastic components together, in which one or both of the plastic components to be adhered contain a curing accelerator for an anaerobic curing adhesive, and which comprises the step of: coating the anaerobic curing adhesive on one or both of the adhering surfaces of the plastic components to be adhered, and laying one adhering surface on the other adhering surface of the components. The curing accelerator of the anaerobic adhesive is generally added to the plastic component by kneading.

A jointed structure of the present invention may be adhered by anyone of the methods mentioned above.

For effecting the method of this invention, it is more advantageous to in advance prepare and keep interim components which include cured films formed by coating activation energy ray curing compositions containing a curing accelerator of an anaerobic curing adhesive on the adhering surfaces of the components and then irradiating activation energy rays onto the coated activation energy ray curing compositions.

Further, it is also possible to prepare plastic components containing a curing accelerator of an anaerobic curing adhesive.

As the method of giving accelerating properties to an anaerobic curing adhesive by blending a curing accelerator with the anaerobic curing adhesive, there can be mentioned a method of directly dissolving in the activation energy ray curing compositions organometallic compounds, such as copper naphthenate, copper octanoate, copper 2-ethylhexanoate, copper acetylacetonate, cobalt naphthenate, cobalt octanoate, cobalt 2-ethylhexanoate, cobalt acetylacetonate, nickel naphthenate, nickel octanoate, nickel 2-ethylhexanoate, nickel acetylacetonate, manganese naphthenate, manganese octanoate, manganese 2-ethylhexanoate, manganese acetylacetonate, vanadium naphthenate, vanadium 2-ethylhexanoate and vanadium acetylacetonate, and a method of dispersing in the activation energy ray curing compositions inorganometallic salts, such as copper chloride, copper bromide, copper iodide, copper sulfate, copper carbonate, vanadium chloride, vanadium sulfate, vanadium carbonate, cobalt chloride, cobalt sulfate and cobalt carbonate with its crystal being finely pulverized by a paint roll or the like means. These compounds are already known and used as a curing accelerator of an anaerobic curing adhesive.

The activation energy ray curing compositions added in advance with such a curing accelerator of an anaerobic curing adhesive can be kept before using them, or a curing accelerator of an anaerobic curing adhesive can be added to the activation energy ray curing compositions just before coating them.

As the method of coating activation energy ray curing compositions added with a curing accelerator of an anaerobic curing adhesive, conventional methods can be used directly. For example, spray coating, coating with a roll coater, screen coating, coating with a gravure coater, coating with a flow coater or coating with a spinning coater can be used.

Also, conventional methods can be used as the method of curing the activation energy ray curing compositions added with the curing accelerator of an anaerobic curing adhesive. Namely, the compositions can be cured by irradiation of activation energy rays, such as ultraviolet rays, visible rays or electron rays.

The cured states of the activation energy ray curing compositions depend upon strength of activation energy rays and an irradiation time thereof. Generally, the difference of cured states tends to be conspicuous if the cured surfaces are in contact with the air. In the present invention, however, even in a state where tack is remaining because of insufficient irradiation or in a state where there is no surface tack because of excessive irradiation, the accelerating effect to the anaerobic curing adhesive can be controlled in an applicable range even if there are some differences in the curing rate.

Many compositions have been proposed as the anaerobic curing adhesive. Generally, such compositions comprise unsaturated radical polymerization compounds, such as acrylic monomers, methacrylate monomers, acrylic oligomers and methacrylate oligomers, quinone-type stabilizers, organic peroxide-type curing initiators and curing catalysts.

As the curing catalysts, various known compounds, for example, saccharin, mercaptan compounds, pyrazole compounds, pyrazolone compounds, toluidine compounds and various amine-type compounds are used. Such compounds can be used alone or in combination with some of the others. Further, an anaerobic curing system is not only used alone, but also used in combination with other curing systems, such as a curing system using activation energy rays (ultraviolet rays or the like), a curing system using moisture and a curing system using a curing accelerator.

As the unsaturated radical polymerization compounds, there can be mentioned radical polymerization monomers mainly containing acrylates and/or methacrylates. Further, the acrylates and/or methacrylates (i.e., (meth)acrylates) include alkyl-type or substituted alkyl-type monofunctional (meth)acrylates, such as methyl (meth)acrylate, ethyl (meth)acrylate, stearyl (meth)acrylate, benzyl (meth)acrylate, isobornyl (meth)acrylate, dicyclopentenyl (meth)acrylate and dicyclopentenyloxyethyl (meth)acrylate; ether-type monofunctional (meth)acrylates, such as methoxyethyl (meth)acrylate, methoxydiethylene glycol (meth)acrylate and methoxypolyethylene glycol (meth)acrylate; alkylene-type bifunctional (meth)acrylates, such as ethylene glycol di(meth)acrylate, 1,3-butylene glycol di(meth)acrylate and neopentyl glycol di(meth)acrylate; ether-type bifunctional (meth)acrylates, such as diethylene glycol di(meth)acrylate, polyethylene glycol di(meth)acrylate, polypropylene glycol di(meth)acrylate, triethylene glycol di(meth)acrylate and tetraethylene glycol di(meth)acrylate; trifunctional (meth) acrylates, such as trimethylolpropane tri(meth)acrylate and trimethylolethane tri(meth)acrylate; multifunctional (meth) acrylates, such as pentaerythritol tetra(meth)acrylate, dipentaerythritol poly(meth) acrylate and tetramethylolmethane tetra(meth)acrylate; polar-group containing or substituted-atom containing (meth)acrylates, such as 2-hydroxyethyl (meth)acrylate, tetramethylolmethane (meth)acrylate, pentaerythritol tri(meth)acrylate, 2,3-dibromopropyl (meth) acrylate, tetrahydrofurfuryl (meth)acrylate, 2-chloroethyl (meth)acrylate, dimethylaminoethyl (meth)acrylate; epoxy (meth)acrylates, such as 2,2-bis (4-acryloxy-diethoxyphenyl)propane di(meth)acrylate, bisoxypolyethylene-type bisphenol A-di(meth)acrylate, bisoxypropylene-type bisphenol A -di(meth)acrylate and bisoxy-2-hydroxyethyl-type bisphenol A -di(meth)acrylate; polyester di(meth)acrylates, such as adipic acid-1,6-hexanediol-di (meth)acrylate; and urethane (meth)acrylates.

Such (meth)acrylates can be used alone or in combination with some of the others. A small amount of monomers other than the above (meth)acrylates can be used with them. With solid monomers, it is preferable to use together liquid monomers, such as 2-hydroxyethyl methacrylate.

As the quinone-type stabilizers, there can be mentioned p-benzoquinone, α-naphthoquinone, hydroquinone and hydroquinone monomethyl ether.

As the organic peroxide-type curing initiators, there can be mentioned cumene hydroperoxide, t-butyl hydroperoxide, paramentane hydroperoxide, 2,5-dimethylhexane-2,5-dihydroperoxide, 1,1,3,3-tetramethylbutyl hydroperoxide, methylethylketone peroxide, dicumyl peroxide, benzoyl peroxide, t-butyl peroxy-2-ethyl hexanoate, t-butyl peroxybenzoate, cumyl peroxyoctanoate and t-butyl peroxyallyl carbonate.

In some cases, various additives may be added to the basic materials. For example, the additives are coloring agents, thickening agents, antisagging agents or tackifiers. In this invention, any of these various kinds of anaerobic curing compositions can be used effectively.

Generally, the activation energy ray curing compositions may include a wider range of compositions containing low-viscosity coating compositions referred to as protective coats, hard coats or metal sealers, and materials used as medium to high viscosity adhesives.

Many compositions have been proposed as the activation energy ray curing compositions. Namely, the compositions include compounds to be obtained by adding activation energy ray curing initiators to (meth)acrylate compounds, epoxy compounds, allyl compounds, or compositions mainly containing polyene and polythiol; and compounds to be obtained by blending the above compounds.

as (meth)acrylate compounds to be used for obtaining the activation energy ray curing compositions, the same compounds as those used for the anaerobic curing adhesive can be used.

As the epoxy compounds, alicyclic epoxy compounds are chiefly used. However, aliphatic epoxy compounds and aromatic epoxy compounds can also be used for controlling the physical properties.

As the allyl compounds, it is possible to use any compounds to be obtained by substituting (meth)acrylate groups of the above (meth)acrylate compounds used for the anaerobic curing adhesive by allyl groups.

Also, various kinds of activation energy ray curing initiators can be used in the present invention. As the initiators, there can be mentioned chemical compounds which generate activation radicals by irradiation of activation energy rays, for example, benzyl, benzyl dimethyl ketal, benzoin isopropyl ether, benzophenone and thioxanthone; and compounds which generate Lewis acids by irradiation of activation energy rays, for example, triallyl sulfonium salts, pyridinium salts, iodonium salts and iron-allene complex compounds.

In this invention, to the activation energy ray curing compositions the above organometallic or inorganometallic compounds as a curing accelerator of an anaerobic curing adhesive are added, when using them. Such metallic compounds can be used alone or in combination with some of the others.

This invention is used not only for producing jointed goods, for example, plastic articles including optical disks in accordance with the method described above using various materials, but also for preparing intermediate materials, for example, plastic components by coating the activation energy ray curing compositions containing the curing accelerators of the anaerobic curing adhesive on the adhering surface and then irradiating activation energy rays onto the coated activation energy ray curing compositions to form cured films.

As the plastic materials to which this invention is applied, there can be mentioned polycarbonate, vinyl chloride, acrylic materials and other various general plastics and engineering plastics.

In the prior art, rapid curing of an anaerobic adhesive by adding a curing accelerator to activation energy ray curing compositions has not been tried. Namely, the effect of the curing accelerator was considered unexpectable because the constituents of the curing accelerator is sealed up in the cured film of the activation energy ray curing compositions so that it does not work sufficiently.

However, the present inventors have studied the combination use of activation energy ray curing compositions and an anaerobic adhesive, and found that the curing acceleration effect of the anaerobic adhesive can be exactly obtained by adding a curing accelerator of the anaerobic adhesive to activation energy ray curing compositions, coating the activation energy ray curing compositions on plastic materials, and irradiating activation energy rays onto the curing compositions until the surface tack disappears.

The above and other objects, features and advantages of the present invention will become manifest to those skilled in the art on making reference to the following description of preferred embodiments.

DETAILED DESCRIPTION OF THE INVENTION

The present invention will be described below with reference to certain preferred embodiments.

EXAMPLES 1,2 AND COMPARATIVE EXAMPLE 1

[1]Preparation of an anaerobic adhesive 100 parts by weight (hereinafter, "parts" means "parts by weight") of triethylene glycol dimethacrylates, 0.01 part of benzoquinone, 2 parts of 3,5-dimethyl pyrazole, 0.2 part of 1-phenyl-3-methyl-5-pyrazolone, 3 parts of acrylic acid and 4 parts of cumene hydroperoxide were supplied into a glass beaker, and then stirred and dissolved uniformly with a laboratory stirrer to prepare an anaerobic adhesive. (The prepared solution will be referred to as "Solution A".)

[2] Preparation of an activation energy ray curing composition containing a curing accelerator of an anaerobic adhesive 100 parts of 1,6-hexane glycol diacrylate, 20 parts of trimethacryl isocyanurate, 5 parts of benzyl dimethyl ketal and 1 part of copper 2-ethylhexanoate were added into a glass beaker, and then stirred and dissolved with a laboratory stirrer to obtain an activation energy ray curing composition containing a curing accelerator of an anaerobic adhesive. (The prepared solution will be referred to as "Solution B".)

[3] Preparation of an activation energy ray curing composition to which no curing accelerator of an anaerobic adhesive is added 100 parts of 1,6-hexane glycol diacrylate, 20 parts of trimethacryl isocyanurate, 5 parts of benzyl dimethyl ketal were added into a glass beaker, and then stirred and dissolved uniformly with a laboratory stirrer to obtain an activation energy ray curing composition containing a curing accelerator of an anaerobic adhesive. (The prepared solution will be referred to as "Solution C".)

[4] Preparation and test of a test piece

Solutions B and C were coated using a spinning coater on polycarbonate test pieces having width of 25 mm, length of 100 mm and thickness of 4.0 mm, respectively. The curing composition of each test piece was cured by irradiation of ultraviolet rays of 300 mJ/cm$^2$ with an ultraviolet ray irradiating device having a metal halide lamp as the light source to form a flat and smooth cured film having thickness of about 50 μ. Both Solutions B and C were cured enough with no surface tack. Then, Solution A was coated on one of each pair of these polycarbonate plates with the cured film of the activation energy ray curing composition being formed thereon. Thereafter, the one of the carbonate plates was laid on the other with a one-inch lap, and the two lapped plates were then held transiently with two pinch cocks.

On each prepared test piece the setting time under condition of being left at 20° C. and the shearing force after 24 hours passed were measured. In that case, the setting time was determined as the time when the two polycarbonate plates became unmovable by hand.

[5] Test results

In Example 1 where both adhering surfaces of the polycarbonate plates were coated with Solution B, the setting time was 5 minutes or shorter, and the shearing time was 45.5 Kgf/cm$^2$.

In Comparative example 1 where both adhering surfaces of the polycarbonate plates were coated with Solution C, the curing composition was not cured even after 24 hours passed. Also, the shearing force could not be measured in such an uncured state.

In Example 2 where one adhering surface of the polycarbonate plates were coated with Solution B while the other adhering surface was coated with Solution C, the setting time was 5 minutes or shorter, and the shearing time was 43.8 Kgf/cm$^2$ From the above results, it can be seen apparently that a good adhesive condition can be obtained if at least one of the mating adhering surfaces is coated with the activation energy ray curing composition containing the curing accelerator of the anaerobic adhesive.

EXAMPLES 3, 4 AND COMPARATIVE EXAMPLES 2, 3

Test results when an irradition amount of ultraviolet rays was changed in preparing the test pieces of the above step [4]

The irradiation amount of ultraviolet rays was changed to 50 mJ/cm$^2$ (Example 3 and Comparative example 2) or to 1000 mJ/cm$^2$ (Example 4 and Comparative example 3) in curing the activation energy rays curing composition. In the case of 50 mJ/cm$^2$, the irradiation amount was insufficient both in the cases of Solutions B and C so that the surface tack still remained. In the case of 1000 mJ/cm$^2$, the surface was completely cured like in an overcured state.

The setting time and the shearing force were then measured respectively in the same manner as the above step [4]. In the case of 50 mJ/cm$^2$ irradiation (Example 3) to the polycarbonate plate coated with Solution B, the setting time was 4 minutes, and the shearing force was 46.7 Kgf/cm$^2$. Further, even in the case of 1000 mJ/cm$^2$ (Example 4), the setting time was 5 minutes, and the shearing force was 41.6 Kgf/cm$^2$.

In the case of polycarbonate plate coated with Solution C, both the setting time and the shearing force in the respective cases of 50 mJ/cm$^2$ (Comparative example 2) and 1000 mJ/cm$^2$ (Comparative example 3) could not be measured because the curing composition remained uncured even after 24 hours passed.

EXAMPLE 5

Long time shelf test on a curing accelerator film of an activation energy ray curing composition to which a curing accelerator of an anaerobic curing adhesive is added Solution B was coated on polycarbonate plates, and ultraviolet rays of 300 mJ/cm$^2$ are irradiated onto the coated plates. After being left for one month in a constant-temperature and constant-humidity bath adjusted at 20° C., and 65% of relative humidity, the plates were coated with Solution A, and the setting time and the shearing force were measured in the same manner as the above step [4].

As the result, the setting time was 5 minutes which was the same as the setting time measured before the long time shelf test. Also, the shearing force was 44.6 Kgf/cm$^2$ which was not changed from the value measured before the same shelf test.

COMPARATIVE EXAMPLE 4

The case in which an activation energy ray curing composition added with a curing accelerator of an anaerobic adhesive is not coated When Solution A was directly coated on a polycarbonate plate, the polycarbonate plate was dissolved by the solution so that the adhesion test could not be conducted.

COMPARATIVE EXAMPLE 5

Method of coating a conventional liquid curing accelerator of an anaerobic adhesive An isopropyl alcohol solution of copper 2-ethylhexoate as a conventional curing accelerator of an anaerobic adhesive was coated on polycarbonate plates. Thereafter, the coated solution was dried. With these polycarbonate plates, the setting time and the shearing time of Solution A were evaluated, respectively.

The setting time as 1 minute which was relatively short, while the shearing force was 10 Kgf/cm$^2$ which was very low as compared with the above Examples.

EXAMPLES 6, 7

The cases of vinyl chloride plates and acrylic plates

The cases of vinyl chloride plates (Example 6) and acrylic plates (Example 7) were also tested in the same manner as the case of polycarbonate plates. The setting time, in both the cases, was 5 minutes which Was the same as the case of polycarbonate plates. The shearing force in the case of vinyl chloride plates was 55.3 Kgf/cm$^2$ at which the test piece was broken. Also, the shearing force in the case of acrylic plates was 51.5 Kgf/cm$^2$ showing very high adhesivity.

As is clearly seen from the description on the above Examples, the adhesion method of coating an activation energy ray curing composition containing a curing accelerator of an anaerobic adhesive according to the present invention is very excellent in that it can enhance adhesivity of materials without degrading rapid curing properties of an anaerobic adhesive.

As stated above, according to the present invention, stable and rapid-curing adhesion of various kinds of components, for example, plastic components can be provided. Specifically, in the industrial fields, the present invention can be utilized with high efficiency in the in-line adhesion assembly of various kinds of components, for example, plastic components, such as an adhesion assembly process of optical disks for adhering plastic plates together.

Obviously, various modifications and variations of the present invention are possible in the light of the above teaching. It is therefore to be understood that within the scope of the appended claims the invention may be practiced otherwise than as specifically described.

What is claimed is:

1. A rapid curing adhesion method for adhesion assembly of an optical disk by adhering plastic plates together, comprising the steps of:

coating an activation energy ray curing composition containing a curing accelerator for an anaerobic curing adhesive on one or both of adhering surfaces of the plastic plates to be adhered, forming a cured film by irradiating activation energy rays onto the coated activation energy ray curing composition, coating the anaerobic curing adhesive on one or both of the adhering surfaces of the plastic plates to be adhered, and laying one adhering surface on the other adhering surface of the plastic plates.

2. A rapid curing adhesion method according to claim 1, wherein the surface of the plastic plate is vapor deposited or coated with a metal.

3. A rapid curing adhesion method according to claim 2, wherein the metal is aluminium, gold, silver, copper or tantalum.

4. A rapid curing adhesion method for adhesion assembly of an optical disk by adhering plastic plates together, in which one or both of the plastic plates to be adhered contain a curing accelerator for an anaerobic curing adhesive, and which comprises the steps of:

coating the anaerobic curing adhesive on one or both of the adhering surfaces of the plastic plates to be adhered, and laying one adhering surface on the other adhering surface of the plastic plates.

* * * * *